March 24, 1959 E. O. PETERSON ET AL 2,878,841

LEAD STRAIGHTENING MACHINE

Filed Aug. 27, 1954

Inventors:
Bernard A. Harvey;
Eric O. Peterson,
by Donald N. Timbie
Their Attorney United States Patent Office 2,878,841

Patented Mar. 24, 1959

2,878,841

LEAD STRAIGHTENING MACHINE

Eric O. Peterson, Syracuse, and Bernard A. Harvey, North Syracuse, N.Y., assignors to General Electric Company, a corporation of New York Application August 27, 1954, Serial No. 452,608

9 Claims. (Cl. 140—147)

The present invention relates generally to apparatus for processing electrical components, and more particularly for straightening and wiping the external terminals or leads of electrical components or elements such as resistors, capacitors, and the like. Though not limited thereto, the invention is of particular utility in preparing elements of the aforementioned type for automatic assembly in electronic and electrical equipment, such as radio and television chassis or subassemblies thereof.

Due to the various forces exerted upon elements such as resistors, capacitors and the like during their manufacture, packaging and shipment to places of assembly into appropriate electrical apparatus, the external leads of such elements are usually bent into various random configurations, as opposed to relatively straight, outwardly-extending leads as generally required for mechanized assembly of radio or television chassis, or the like.

Various attempts have been made in the past to straighten the malformed leads of such electrical elements in order to prepare them for either manual or automatic assembly in electrical apparatus.

For the most part, lead straightening apparatus of the past has been in the form of cumbersome and complicated machines whose operativeness was other than dependable and whose handling of the electrical elements was such that many elements were damaged in the straightening process, as by breaking or pulling the leads free from the element itself.

It is an object, therefore, of the present invention to provide an improved apparatus for straightening the lead wires of electrical elements.

It is another object of the present invention to provide lead straightening apparatus which is relatively simple and efficient of operation.

It is still another object of the present invention to provide an improved lead straightening apparatus capable of effectively straightening the leads of electrical elements without damage to the element itself.

It is still a further object of the present invention to provide improved lead straightening apparatus requiring a minimum amount of maintenance and care.

It is a still further object of the present invention to provide improved lead straightening apparatus capable of applying a rolling and wiping motion to the leads of electrical elements to be prepared thereby.

In accordance with one form of the present invention there is provided a pair of generally disk-like members each of which is adapted to have a surface thereof mounted with respect to pressure-shoe means, so that an electrical element may be caused to move relative to the two disk-like members with each of its respective leads being engaged between surfaces of one of the two disk-like members and the pressure-shoe means, the members being rotated in opposite directions whereby an electrical element whose respective leads are engaged between respective ones of the disk-like members and the pressure shoe may be drawn by a wiping and rolling motion between each of the disk-like members and the shoe, such that the lead is moved along the shoe by the disk-like member, thereby to straighten it by a wiping and rolling motion which has force components substantially along and perpendicular to an axis extending generally through both leads.

For additional objects and advantages, and for a better understanding of the invention, attention is now directed to the following description and accompanying drawings.

The features of the invention which are believed to be novel are particularly pointed out in the appended claims.

Figures 1, 2, 3:
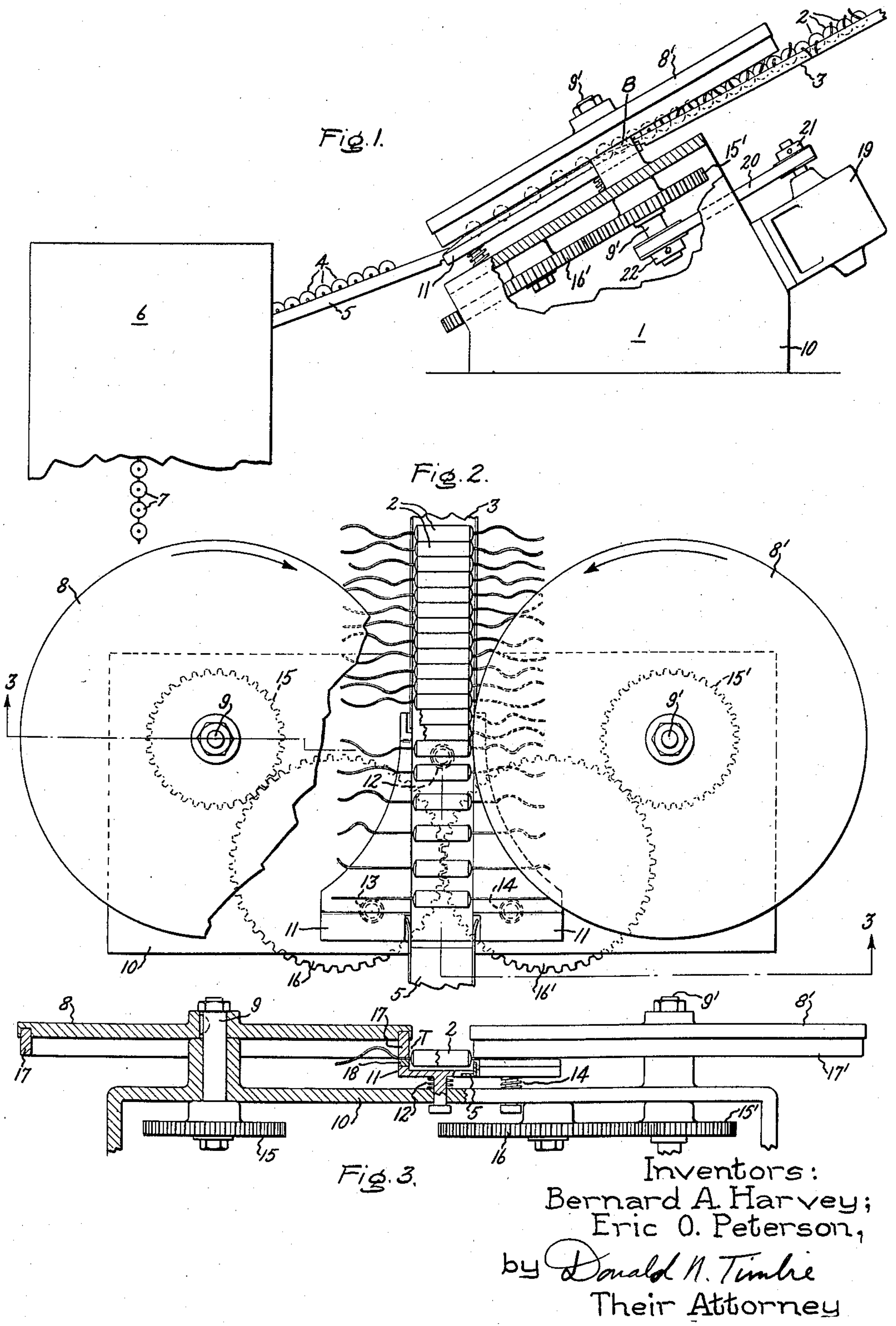
Figure 1 is a side-elevational view, partly in cross-section, showing a lead-straightening device constructed in accordance with the present invention.
Figure 2 is a plan view, partly in section, showing a portion of the scene depicted in Figure 1, including a lead-straightening machine constructed in accordance with the present invention; and, Figure 3 is an end view, partly in section, taken along the line 3—3 of Figure 2 and showing a portion of the lead-straightening machine illustrated in two preceeding figures.

Referring now to Fig. 1, there is shown generally at 1 a lead-straightening machine into which a number of electrical elements 2 having unstraightened leads are being fed along a gravity or mechanically fed chute 3, hereinafter referred to as the input chute. Other electrical elements 4 having straightened leads by virtue of the operation of the machine 1 are shown as they come from the lead-straightening machine along a second gravity chute 5, referred to as the output chute, for further processing by means of the banding machine 6 where they may be joined in a continuous belt of components 7 for further processing in automatic assembly.

As may be seen by reference now to Fig. 2, the electrical elements 2 with unstraightened leads, which may hereinafter be termed unprocessed elements, are fed by gravity or other means down the input chute 3 running between a pair of disk-like members 8, 8′ arranged in cooperation with a pressure-shoe member 11. The elements 2 move down the input chute at such an elevation that their unstraightened leads abut against the lower surfaces of the two disk-like members 8, 8′ and the upper surface of the pressure shoe 11, whereby each of the leads are engaged between one of the disk-like members 8, 8′ and the pressure shoe 11 in a manner to be described.

The lead-straightening machine 1 comprises the aforementioned pair of disk-like members 8, 8′ mounted by means of their respective shafts 9, 9′ on a base member 10. The input chute 3 is situated between the two disk-like members 8, 8′ and feeds into a trough T (see Fig. 3) which passes through the upper surface of the pressure-shoe member 11 mounted on the base member 10 below the underface of the two disk members 8, 8′ such that the disk members overlap the edges of the pressure shoe a predetermined amount. In the present embodiment, the pressure shoe may be considered somewhat triangular in shape. The respective sides of the triangle facing the respective disk-like members 8, 8′, are preferably curved inwardly, and in the present embodiment are shown having approximately the same center of curvature as that of the two disk-like members. The pressure shoe is supported in such manner as to give uniform upward distribution of force components, which may be conveniently accomplished by means of a series of compression springs, as shown, or by other means such as hydraulic or pneumatic cylinders properly arranged, for example. The tripod spring arrangement presently employed, comprises a first spring 12 positioned generally between the two disk-like members 8, 8′ and second and third springs 13, 14, located opposite the output chute 5 on the output side of the machine.

It is noted that the pressure shoe 11 occupies a position with respect to the two disk-like members 8, 8′ such that it abuts against a peripheral area generally less than one quadrant of each of the disk-like members 8, 8′, this quadrant being what may be termed the output quadrant of the device, beginning approximately at a point on a line drawn between the centers of the two disk-like members 8, 8′.

The two disk-like members 8, 8′ are mechanically coupled, preferably by a positive mechanical linkage, as for example the illustrated gear-train comprising a first pair of gears 15, 15′ coupled to the disk-like members 8, 8′ and a second pair of gears 16, 16′ arranged in series driving relation therebetween, in order to provide uniform rotation of the two disk-like members 8, 8′ in opposite directions. The direction of rotation must be such that the adjacent surfaces of the two members 8, 8′ move in the same direction as indicated by the arrows, this being in the direction of feed of the device from input to output side.

As may be seen in greater detail by reference now to Fig. 3, each of the two disk members 8, 8′ comprise a wheel having its outer perimeter fitted on its underside with a generally annular lip in the form of a band or cylinder 17, 17′ preferably formed of material such as leather, hard rubber, plastic or other suitable material having sufficient resilience to provide means for imparting a wiping and rolling motion to the leads of the elements to be straightened. The upper surface 18 of the pressure shoe 11 is also fitted with similar material, except for the center trough T running therethrough to permit the body portion of electrical elements to pass through freely during processing. Preferably, the sides of the trough are parallel to one another and approximately tangent to the respective disk members 8, 8′.

The two disk-like members 8, 8′ may conveniently be driven by an electric motor 19, such as that shown in Fig. 1 coupled to the shaft 9′ of the disk members 8′ by means of a conventional V-belt 20 and associated V-pulleys 21, 22.

Although it is desirable that the two disk-like members 8, 8′ be coupled by sufficiently positive driving mechanism to insure uniform and synchronous rotation; nevertheless, the degree of positive coupling between the motor and the two members need not be quite so critical, inasmuch as a slight slippage imparted at this point will be applied equally to the two members 8, 8′ by means of the positive coupling therebetween.

In operation, a number of unprocessed elements, shown at 2 on the input chute 3 may conveniently be fed into the device such that their respective leads are approximately transverse to the axis of the input chute 3 running between the two disk-like members 8, 8′. Preferably, the input chute 3 may be declined at a lesser angle than the two disk members, 8, 8′ or provided with an upward slope as it approaches the pressure shoe so that random shaped leads will not be engaged by either of the disk members 8, 8′ until they come into position at the input end of the pressure shoe 11 where the leads may be conveniently grasped by the lip on the lower edge of the respective disk members 8, 8′ and the upper surface of the pressure shoe 11. The upper face of the input end of the shoe 11 is preferably beveled, as indicated at B, to facilitate grasping of the leads at the proper point.

As each electrical element is grasped by the straightener it is drawn with a wiping and rolling motion imparted by force components which are at first, primarily along the direction of travel of the electrical elements through the machine. As the elements proceed along the trough T, force components are introduced that are perpendicular thereto. These force components are directed outward from the body of the electrical element and should preferably be substantially equal in magnitude. Thus, it is seen that the element is gradually wiped and rolled free of bends and twists by the application of a rolling-wiping motion having force components both along and perpendicular to the axis of the element leads as it is drawn through the device. It is noted that the straightening action applied to the leads is a substantially localized one. As shown in Figure 3, the leads are rolled and wiped straight from the inside out, i.e., they are grasped only between the rim portion 17 or 17′ and the pressure shoe 11, with this localized grasping region moving along the lead from the body of the element to the free end of the lead as the element passes through the machine 1. Thus, the straightening force applied need not be excessively strong at any given moment but may be substantially equal throughout the whole processing of each of the electrical elements.

Although the illustrated embodiment is preferred, another structure for providing gradual localized grasping action provides a pair of ridges on the upper surface of the pressure shoe along the edges overlapped by each of the disk-like members 8, 8′.

Preferably, the width of the trough T in the shoe 11 should correspond generally to the width of the components having their elements or leads straightened so that the straightening action begins at substantially the base of the lead and extends gradually to its outermost end as the electrical element is rolled and wiped through the device.

While it is believed that many of the advantages of the aforesaid machine may be obvious to one skilled in the art upon reading the foregoing and upon inspection of the drawing; nevertheless, it is pointed out that one clear advantage is the gentle, but firm action that may be applied to a lead-straightening by this device, this action extending gradually along the length of the lead as it is processed by the machine.

Another advantage which will be appreciated by those in the field is the relative simplicity of this device. The relative freedom from complicated mechanism and the like is a distinct advantage in reducing maintenance and operational difficulties.

While the above discussion of the operation of the aforementioned machine has been illustrated by the processing of electrical elements having a body portion that is cylindrical in configuration; nevertheless, by a suitable construction of the input chute 3 and of the trough T, extending through the pressure shoe 11 the machine is entirely suited for processing electrical elements having body portions of rectangular, or other configuration. As may be seen by reference to Fig. 3, when the leads of an electrical element are grasped between the two disk-like members 8, 8′ and the pressure shoe 11, it may then be supported entirely by its leads and it is no longer necessary that the body of the component rest on the floor of the trough T as the element passes through the apparatus. Thus, by a suitable trough depth through the pressure shoe 11 various types of electrical elements may be handled by the apparatus.

Although the particular embodiment of the invention herein illustrated shows a pair of flat disk shaped members 8, 8′ for grasping a lead with respect to the pressure shoe 11, obviously other configurations will occur to those skilled in the art which are considered to be within the true spirit and scope of this invention and it is intended to cover such variations as are within the scope of the appended claims.

In a further embodiment of the invention, the pressure shoe means may actually comprise two distinct pressure members, one for each disk-member. In such case, adjustable means may be provided for varying their distance of separation in order to accommodate electrical elements having body portions of different sizes. In order to accommodate such different sized elements, it may be desirable to provide means for varying the distance of separation of the two disk-members. A simple alternative, however, would be to replace the two disk-members with interchangeable disks of a different diameter.

While the pressure shoe means herein illustrated comprises resilient means for urging the shoe means toward the relatively fixed disk-like members, nevertheless, further embodiments may provide fixed shoe means and relatively moveable disk-members biased toward the shoe means, as by means of coil spring mounted along the respective axis of the disk member, for example.

While a specific embodiment has been shown and described, it will of course be understood that various modifications may yet be devised by those skilled in the art which will embody the principles of the invention and found in the true spirit and scope thereof.

What we claim as new and desire to secure by Letters Patent of the United States is:

1. Lead-straightening apparatus comprising first and second circular members each having a corresponding face thereof mounted in a first plane, a pressure shoe having a corresponding surface opposing said faces of said circular members and disposed in an adjacent plane substantially parallel to said first plane, resilient means for maintaining said pressure shoe substantially in one position, means for rotating said circular members substantially the same rotational speed in different directions of rotations, and means for feeding an electrical element having a pair of leads between said circular members such that a portion of the leads of said element are substantially between said two planes, said feed means being adapted and arranged to position said electrical elements such that the respective leads thereof will come in contact with the respective circular members and said pressure shoe, whereby each of said leads are engaged between a respective one of said circular elements and said pressure shoe.

2. Lead-straightening apparatus comprising first and second circular members each having a corresponding face thereof mounted in a first plane, a pressure shoe having a corresponding surface opposing said faces of said circular members and disposed in an adjacent plane substantially parallel to said first plane, said pressure shoe including a trough running through its center, the sides of said trough being substantially parallel and generally tangent to the respective circular members, said pressure shoe having a beveled input portion located substantially between the respective centers of curvature of said two circular members, resilient means for maintaining said pressure shoe substantially in said position, means for rotating said circular members at substantially the same rotational speed in different directions of rotation, and means for feeding an electrical element having a pair of leads between said circular members such that portions of the leads of said element are substantially between said two planes, said feed means being adapted and arranged to position said electrical element such that the respective leads thereof will come in contact with the respective circular members and said pressure shoe, whereby each of said leads are engaged between a respective one of said circular elements and said pressure shoe.

3. A lead-straightening apparatus comprising first and second rotatable members mounted in spaced relation to one another, each of said rotatable members including a generally uniform peripheral region, each of said regions having substantially the same radius of curvature and coplanar with the other region, pressure shoe means having surfaces overlapping at least a portion of said peripheral regions, means for urging said pressure shoe means into resilient contact with the peripheral region of each of said two rotatable members thereby to provide an engaging region of contact, means for synchronously rotating said two members in counter-rotational directions, means for feeding electrical elements including oppositely disposed leads generally between said rotatable members such that each of the leads may be engaged between a respective one of said peripheral regions and said pressure shoe means and substantially straightened with respect to the general axis extending through both leads by a wiping and rolling motion imparted by force components which are substantially along and perpendicular to this general axis.

4. A lead-straightening apparatus comprising a base structure, first and second rotatable disk members mounted in spaced relation on said base structure, pressure shoe means mounted on said base structure generally between the axes of said two disk members, the periphery of each of said two disk members being coplanar with the other and substantially in overlapping surface engagement with said pressure shoe means, the region of overlapping contact of said respective disk members and said pressure means being faced with relatively smooth, resilient material such as leather, means for rotating said disk members in synchronism in the opposite directions of rotation, and means for feeding electrical components including oppositely disposed leads between said disk members such that the respective leads of said components may be engaged between the periphery of one of said disk members and said pressure shoe means whereby an electrical component whose respective leads are engaged thereby may be drawn by a wiping and rolling motion between the respective disk member and pressure shoe means thereby to straighten the leads of the component by the application of force components substantially along and perpendicular to the axis extending generally through both leads.

5. A lead-straightening apparatus comprising, a pair of generally disk-like members, means for mounting said two members in spaced relation, pressure shoe means mounted on one side of each of said two disk-like members, means for synchronously rotating said two members in opposite directions, the disk-like members having common coplanar surfaces and said pressure shoe means having surfaces that overlap said co-planar surfaces, the region of overlap of said surfaces extending inwardly from the edges of each of said disk-like members a short distance with respect to the length of the leads to be straightened and the region of overlap of said surfaces beginning approximately on a line drawn between the axes of rotation of said two members and extending in the direction of rotation of said two members.

6. Apparatus as set forth in claim 5 wherein means are provided for feeding electrical elements including oppositely disposed leads generally between said rotatable members such that each of the leads may be engaged between a respective one of said peripheral regions and said pressure shoe means.

7. Apparatus for straightening a lead extending from a body comprising a disk, a pressure shoe, said pressure shoe having a substantially flat surface adjacent to and overlapping the outer periphery of said disk to thereby form an overlapping arcuate surface between one side of said disk and said pressure shoe, said overlapping shoe surface and overlapped periphery of said disk lying in parallel adjacent planes, means for rotating said disk and means for restricting the path of movement of said body along a straight line that is parallel to a line drawn tangent to the circumference of said disk at a point where said disk and said pressure shoe first overlap whereby the flat surface of the shoe abuts against a peripheral area of the disk in such a manner as to substantially straighten a lead of said body by a wiping and rolling motion having force components substantially along and perpendicular to the axis of said lead.

8. Apparatus for straightening leads extending from opposite sides of a body comprising a first disk, a second disk, said disks each having a corresponding face thereof mounted in the same plane, a pressure shoe mounted on one side of said disks, means for synchronously rotating said disks in opposite directions, said pressure shoe having a first surface adjacent to and overlapping the outer periphery of said first disk and a second surface adjacent to and overlapping the outer periphery of said second disk, means for restricting the movement of said body along a straight line between said first and second surfaces midway between the axis of said first disk and the axis of said second disk whereby leads of said body are straightened by a wiping and rolling motion having force components substantially along and perpendicular to the axis of said leads.

9. Apparatus for straightening leads extending from opposite sides of a body comprising a first disk, a second disk, said disks each having a corresponding face thereof mounted in the same plane, a pressure shoe mounted on one side of said disks, means for synchronously rotating said disks in opposite directions, said pressure shoe having a first surface adjacent to and overlapping the outer periphery of said first disk and a second surface adjacent to and overlapping the outer periphery of said second disk, means for restricting the movement of said body along a straight line midway between the axis of said first disk and the axis of said second disk whereby leads of said body are straightened by a wiping and rolling motion having force components substantially along and perpendicular to the axis of said leads.

References Cited in the file of this patent

UNITED STATES PATENTS

| | | |
|---|---|---|
| 1,071,945 | Moon | Sept. 2, 1913 |
| 1,109,662 | Cavanagh | Sept. 8, 1914 |
| 2,424,917 | Brannock | July 29, 1947 |
| 2,622,654 | Frank | Dec. 23, 1952 |
| 2,727,541 | Preston | Dec. 20, 1955 |